United States Patent
Li et al.

(10) Patent No.: US 11,415,534 B2
(45) Date of Patent: Aug. 16, 2022

(54) INTERSPERSING DIFFERENT WAIT TIMES IN TRAINLET AND PARTIAL RECOVERY SEQUENCES

(71) Applicant: Halliburton Energy Services, Inc., Houston, TX (US)

(72) Inventors: Lilong Li, Houston, TX (US); Yuesheng Cheng, Spring, TX (US); David R. Beard, Houston, TX (US); Arcady Reiderman, Richmond, TX (US); Songhua Chen, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/765,360

(22) PCT Filed: Jan. 10, 2018

(86) PCT No.: PCT/US2018/013212
§ 371 (c)(1),
(2) Date: May 19, 2020

(87) PCT Pub. No.: WO2019/139582
PCT Pub. Date: Jul. 18, 2019

(65) Prior Publication Data
US 2020/0355635 A1    Nov. 12, 2020

(51) Int. Cl.
*G01N 24/08*    (2006.01)
*G01V 3/32*    (2006.01)

(52) U.S. Cl.
CPC ............ *G01N 24/081* (2013.01); *G01V 3/32* (2013.01)

(58) Field of Classification Search
None
See application file for complete search history.

(56) References Cited

U.S. PATENT DOCUMENTS

| | | | |
|---|---|---|---|
| 5,389,877 A | | 2/1995 | Sezginer et al. |
| 5,486,762 A | * | 1/1996 | Freedman ............ G01N 24/081 324/303 |
| 5,905,376 A | | 5/1999 | Snyderman et al. |

(Continued)

OTHER PUBLICATIONS

PCT Application Serial No. PCT/US2018/013212, International Search Report, dated Sep. 28, 2018, 3 pages.
(Continued)

*Primary Examiner* — Douglas X Rodriguez
(74) *Attorney, Agent, or Firm* — DeLizio, Peacock, Lewin & Guerra

(57) ABSTRACT

A method and system for interspersing different wait times in trainlet and partial recovery sequences is provided. The method includes introducing a nuclear magnetic resonance (NMR) tool into a wellbore penetrating a subterranean formation. The method also includes applying an NMR pulse sequence to the subterranean formation using the NMR tool, in which the NMR pulse sequence includes at least two different wait times interspersed between successive sequences of radio frequency (RF) pulses. The method also includes measuring one or more echo signals corresponding to a substance in the subterranean formation based on the applied NMR pulse sequence. The method also includes determining a distribution of a characteristic of the substance based on the measured one or more echo signals.

20 Claims, 9 Drawing Sheets

(56) References Cited

U.S. PATENT DOCUMENTS

| | | |
|---|---|---|
| 6,580,272 B2 | 6/2003 | Freed et al. |
| 6,972,564 B2 | 12/2005 | Chen et al. |
| 7,126,333 B2 | 10/2006 | Beard et al. |
| 7,501,818 B2 | 3/2009 | Akkurt |
| 7,825,661 B2 | 11/2010 | Blanz |
| 2003/0006766 A1 | 1/2003 | Kruspe et al. |
| 2017/0254919 A1* | 9/2017 | Coman .................. G01V 3/32 |

OTHER PUBLICATIONS

PCT Application Serial No. PCT/US2018/013212, Written Opinion, dated Sep. 28, 2018, 9 pages.
PCT Application Serial No. PCT/US2018/013212, Written Opinion of the IPEA, dated Mar. 5, 2020, 7 pages.

* cited by examiner

INTERSPERSING DIFFERENT WAIT TIMES IN TRAINLET AND PARTIAL RECOVERY SEQUENCES

TECHNICAL FIELD

The present description relates in general to downhole measurement systems, and more particularly to, for example, without limitation, interspersing different wait times in trainlet and partial recovery sequences.

BACKGROUND

Understanding the structure and properties of geological formations can improve the efficiency of oil field operations such as drilling, well completion, and production. The collection of information relating to conditions downhole, commonly referred to as "logging," can be performed by several methods including nuclear magnetic resonance (NMR) logging.

Presently, NMR logging is considered to be one of the most effective techniques for determining geologic parameters. NMR technology has many advantages over other logging techniques (such as gamma ray logging, sonic logging, electric logging, and others), one of the most significant being the independence of NMR measurements from formation lithology. In particular, NMR data relates in a simple manner to formation pore sizes. This relationship facilitates detection of formation fluids (e.g., gas, oil, and water) independent of the matrix mineralogy. To this end, in addition to estimation of formation porosity, hydrocarbon saturation, and permeability. NMR logging enables computation of clay-bound water, capillary-bound water, and free fluid volumes, which aid in comprehensively evaluating the subterranean formation.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The subject disclosure provides for a wait time interspersed before any possible repeat sequence, while an immediate phase alternation is retained. In contrast, traditional NMR pulse sequences yield measurement inaccuracies arising from steady state buildup during repeated application of partially recovered (Carr-Purcell-Meiboom-Gill) CPMG echo trains, or from the remaining spin order after previous excitations. The interspersion of wait times enables more accurate interpretation of trainlets and T1/T2 interpretations.

Figure 1:
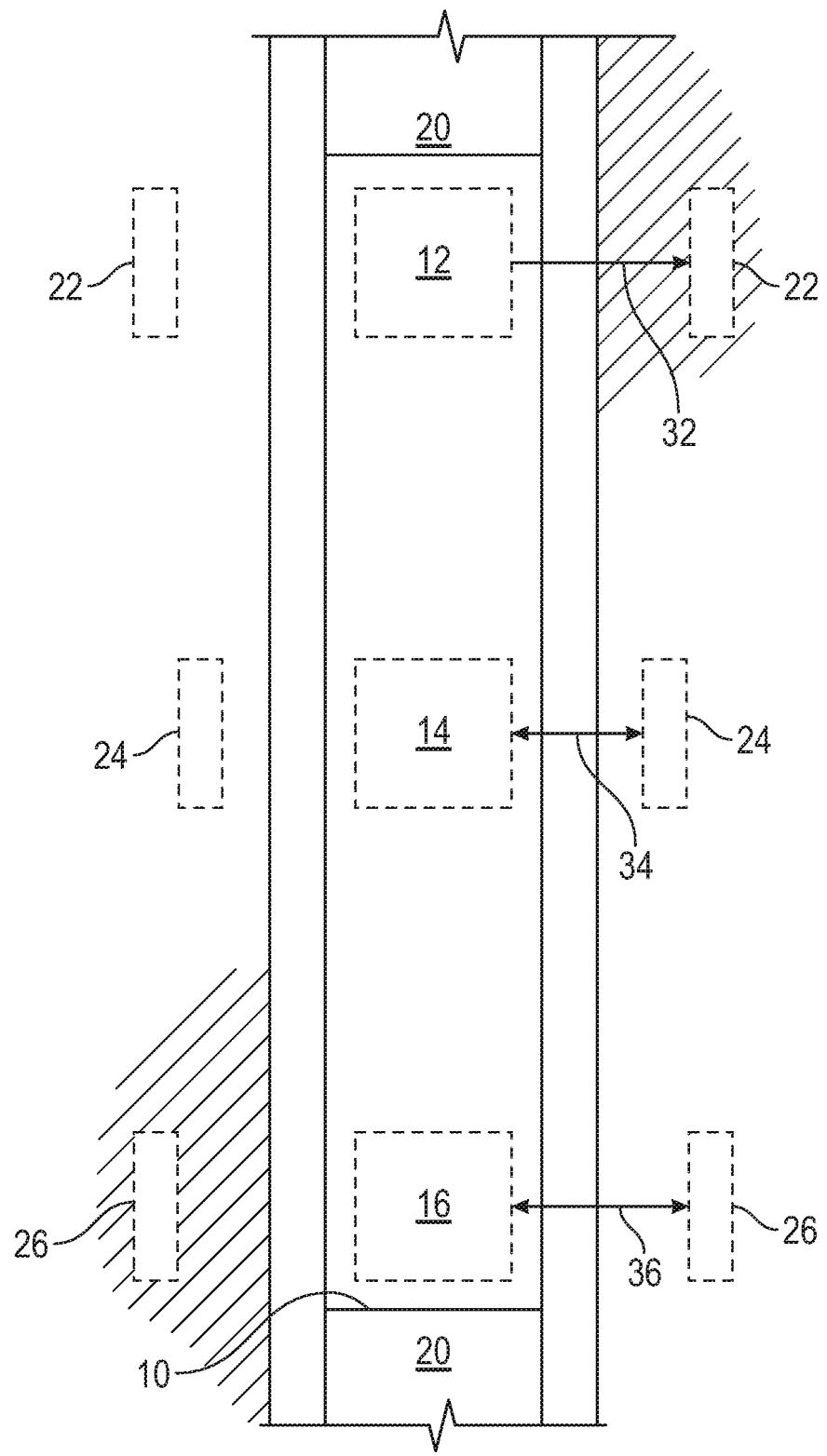
FIG. 1 illustrates a schematic of an example of a NMR tool deployed in a wellbore penetrating a subterranean formation in accordance with one or more implementations.

FIG. 1 illustrates a schematic of an example of a NMR tool 10 deployed in a wellbore penetrating a subterranean formation in accordance with one or more implementations. The NMR tool 10 measures sensitive volumes 22,24,26 at different depths into the subterranean formation 18. The NMR tool is arranged along a drill string 20 and includes three NMR radio frequency (RF) coils 12,14,16. Each NMR RF coil 12,14,16 is configured to measure corresponding sensitive volumes 22,24,26 at specified radial distances 32,34,36 from the NMR tool. As illustrated, two of the NMR RF coils 12,16 measure sensitive volumes 22,26 at the same radial distances 32,36 into the formation 18. Various NMR tool configurations can be used to measure the NMR properties of sensitive volumes at different depths into the formation. In one or more implementations, other known NMR tool configurations may be implemented to investigate the desired number of sensitive volumes. For example, field shaping may be used when the NMR tool includes a single NMR RF coil.

NMR tools of the type discussed above generally measure the time for hydrogen nuclei present in the earth formation to realign their spin axes, and consequently their bulk magnetization, either with an externally applied magnetic field, or perpendicularly to the magnetic field, after momentary reorientation due to the application of specific radio frequency (RF) pulses. The externally applied magnetic field is typically provided by a magnet disposed in the tool. The spin axes of the hydrogen nuclei in the earth formation are, in the aggregate, caused to be aligned with the magnetic field induced in the earth formation by the magnet. The NMR tool includes an antenna positioned near the magnet and shaped so that a pulse of radio frequency (RF) power conducted through the antenna induces a magnetic field in the earth formation orthogonal to the field induced by the magnet. The RF pulse has a duration predetermined so that the spin axes of the hydrogen nuclei generally align themselves perpendicular both to the orthogonal magnetic field induced by the RF pulse and to the externally applied magnetic field. After the pulse ends, the nuclear magnetic moment of the hydrogen nuclei gradually relax, i.e., return to their alignment with the externally applied magnetic field; at the same time an antenna, which is typically the same as the one used by the initial pulse, is electrically connected to a receiver, which detects and measures voltages induced in the antenna by precessional rotation of the spin axes of the hydrogen nuclei.

Nuclear magnetic resonance measurements are created by the oscillation of excited nuclear magnetic spins in the transverse plane, that is, the direction perpendicular to the magnetic field. This oscillation eventually dies out and the equilibrium magnetization returns. The return process is referred to as longitudinal relaxation. The time constant, T1, for nuclei to return to their equilibrium magnetization, Mo, is called the longitudinal relaxation time or the spin lattice relaxation time. The magnetization dephasing, that is losing coherence, along the transverse plane is given by the time constant T2 and is called the spin-spin relaxation time.

The primary objectives in NMR logging are measuring T1 signal amplitude (as a function of polarization), T2 signal amplitude and decay, and their distributions. The total signal amplitude is proportional to the total hydrogen content and is calibrated to give formation porosity independent of lithology effects. Both relaxation times can be interpreted for pore-size information and pore-fluid properties, especially viscosity.

T1 is generally measured by either of two pulse sequences: inversion recovery or saturation recovery. Inversion recovery consists of a 180° spin inversion followed by a variable recovery time and then a 90° read pulse. Saturation recovery uses a 90° pulse, followed by a 90° read pulse. T2 measurement uses the spin-echo technique, in which the protons are first tipped into the transverse (x-y) plane by a 90° RF pulse and then inverted (flipped) by a subsequent 180° RF pulse at a fixed-time interval to rephase the dephasing protons. Rephasing the protons creates a detectable signal called a spin echo. In operation, a sequence of pulses is used to generate a series of spin echoes (echo train) in which echo amplitude decreases exponentially with the time constant, T2.

A widely used NMR measurement technique, designed by Carr, Purcell, Meiboom, and Gill and, hence, referred to as CPMG, uses a sequence of radio frequency pulses to produce spin echoes and counteract dephasing of the magnetization in the medium investigated. In the CPMG pulse sequence, an initial pulse, commonly a 90 pulse, can be applied to tip the polarization into a plane perpendicular to the static magnetic field. To counter dephasing due to magnetic inhomogeneities, another pulse, a recovery pulse, commonly a 180° or other angle tipping pulse, is applied to return to phase, which produces a signal called an echo from the medium. Successive 180° pulses are applied at a fixed-time interval (echo spacing, TE), and the echoes are recorded between the pulses. By recording an echo train, T2 can be calculated from the decay in the height (amplitude) of successive echoes.

However, non-formation signals-often referred to as "offset" or "ringing" signals—arise for a variety of reasons. For example, they may be caused by the high-sensitivity tool electronics (e.g., "offsets"), or may be due to magnetostrictive effects (e.g., "ringing") that arise from interactions between pulsed magnetic fields and electronic or magnetic components in the tool. For example, when RF pulses are applied to the antenna, the magnet can become physically deformed by magnetostriction. After each RF pulse is turned off, the magnet tends to return to its original shape in a series of damped mechanical oscillations, known as "ringing." Ringing induces voltages in the antenna, which can interfere with measurement of the voltages induced by the spin echoes. Typically, two pulse sequences of opposite phase are acquired to cancel electronic offsets and 180-degree ringing. The pair of pulse sequences is called a phase-alternated pair (PAP).

When recording multiple CPMG pulse sequences, the time period between spin-echo recovery and the next 90° C. PMG excitation—during which the protons are repolarized by the static magnetic field—is called the wait time, TW. Each CPMG pulse sequence may use a different wait time, echo spacing, and number of echoes.

Figure 2:
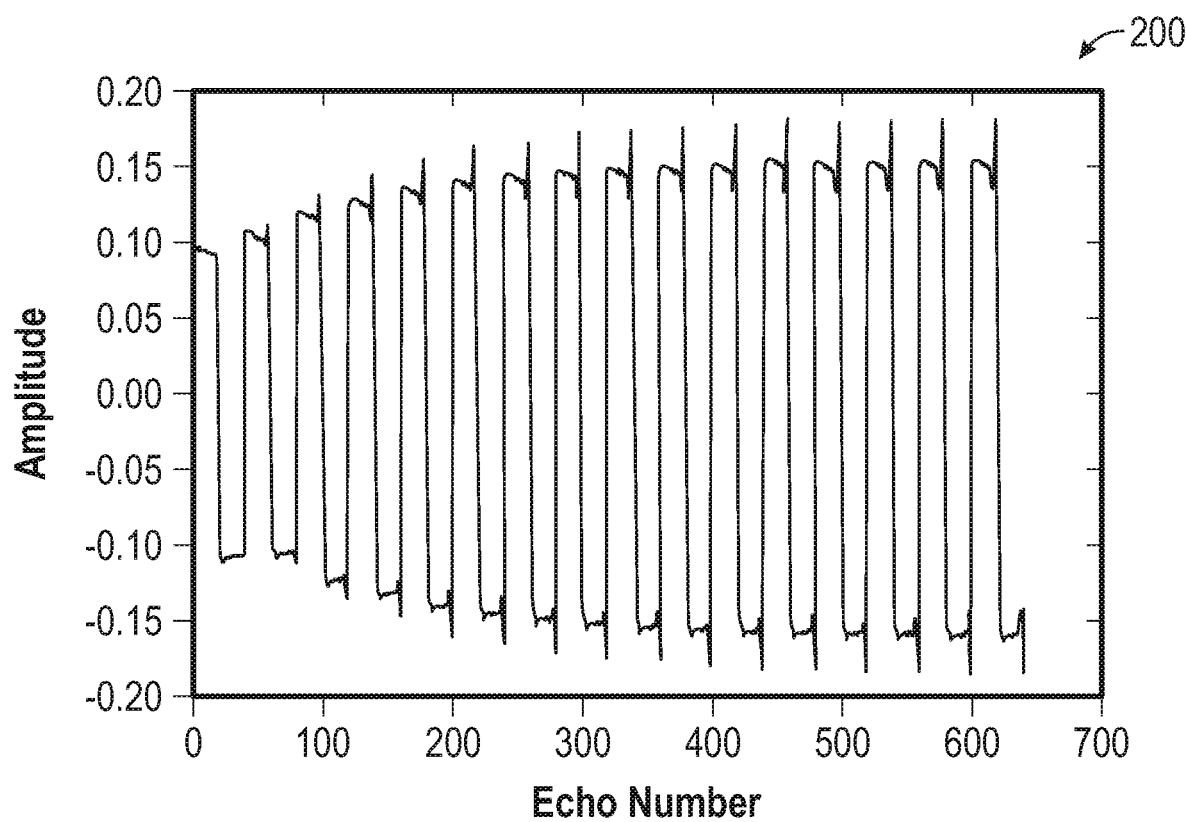
FIG. 2 illustrates a plot 200 depicting an example of a spin dynamics simulation of trainlets in accordance with one or more implementations.

FIG. 2 illustrates a plot 200 depicting an example of a spin dynamics simulation of trainlets in accordance with one or more implementations. In NMR logging, repeated application of CPMG echo trains (trainlets) with a certain wait time that does not allow full spin polarization recovery is often used. A typical approach for variations of such trainlet sequences is to apply echo trains that have the same wait time in immediate succession, i.e., a certain number of repeats. During these repeats, the phase of certain pulses can be alternated. Such PAPs minimize the buildup of steady state amplitude, which can distort the CPMG amplitude away from theoretically predicted values. In some aspects, a theoretical CPMG amplitude can be expressed as equation (1) as follows:

$$Mo\left(1 - e^{\left(-\frac{TW}{T1}\right)}\right) \qquad \text{Eq. (1)}$$

However, such cancellation by, for example, phase alternation of the excitation pulse is incomplete. In some aspects, a pulse sequence can be expressed as equation (2) as follows:

$$[TW-90°_x-\tau-(180°_y-\tau-\text{echo}-\tau)_{NE}-TW-(90°-x)-\tau-\\(180°y-\tau-\text{echo}-\tau)_{NE}]_n \qquad \text{Eq. (2)}$$

where TW is the wait time, τ is about half TE (inter-echo spacing), $90°_x$ is the 90 degree pulse with phase in the x direction, $180°_y$ is the 180 degree pulse with phase in the y direction.

In FIG. 2, the plot 200 pictorially shows a simulation based on Equation (2). The simulation parameters associated with the plot 200 may be as follows: T1=T2=100 ms, TE=0.3 ms, number of echoes (NE)=20, TW=10.5 ms. As depicted in the plot 200, the spins are saturated before application of a trainlet sequence, and the amplitude of a fully polarized spin echo train is normalized to 1. As depicted in the plot 200, the echo amplitude increases away from the theoretically predicted echo amplitude of 0.1 as the echo number increases, and the error is more than 50%.

Figure 3:
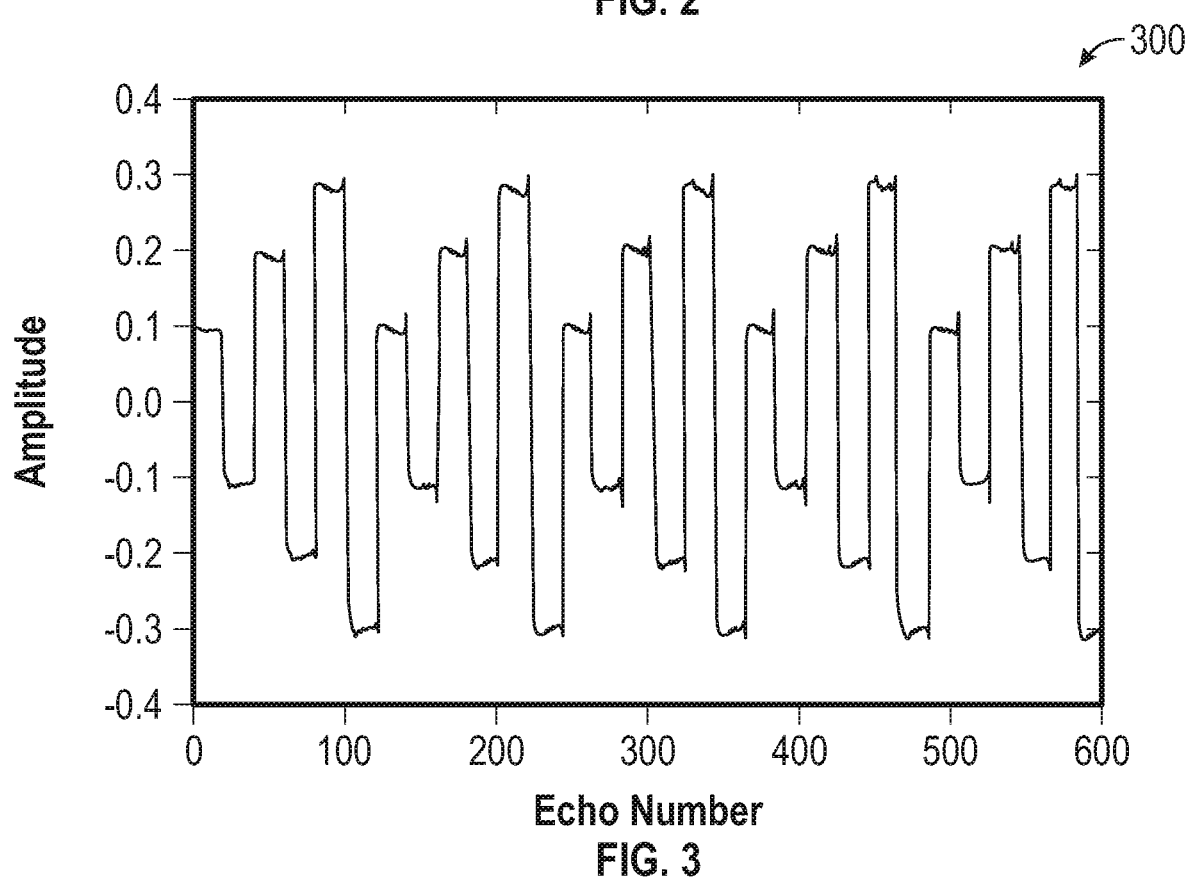
FIG. 3 illustrates a plot depicting an example of a spin dynamics simulation of trainlets using different wait times in accordance with one or more implementations.

FIG. 3 illustrates a plot 300 depicting an example of a spin dynamics simulation of trainlets using different wait times in accordance with one or more implementations. To overcome the problem described in FIG. 2, different wait times (TWs)

can be interspersed before any repeats occur. For example, the spin dynamics simulation can be performed with a pulse sequence that can be expressed as equation (3) as follows:

$$[(TW_1\text{-spin echoes}_1)_{+/-} - (TW_2\text{-spin echoes}_2)_{+/-} - \ldots - (TW_n\text{-spin echoes}_n)_{+/-}]_m \quad \text{Eq. (3)}$$

where $n \geq 2$ and $m \geq 1$, and $TW_1$ through $TW_n$ contain at least two different values. The spin echoes can be CPMG echo trains in some implementations, or any other echo trains in other implementations. The CPMG echo train may be a CPMG sequence that can be expressed as equation (4) as follows:

$$90°_x - \tau - (180°_y - \tau - \text{echo} - \tau)_{NE} \quad \text{Eq. (4)}$$

where +/− refers to a phase alternated pair. In FIG. 3, the amplitudes of the trainlets correlate closer to the theoretical values when compared to the amplitudes of the trainlets of FIG. 2. The simulation parameters associated with the plot 300 may be the same as those of the simulation described in FIG. 2 with the exception that the wait times associated with the plot 300 are set to 10.5 ms, 22.3 ms, and 35.7 ms. In some implementations, other wait times may be employed in the pulse sequence without departing from the scope of the disclosure. As pictorially shown in FIG. 3, the corresponding echo amplitudes can be expected to be set to 0.1, 0.2, and 0.3, for example. In some aspects, the amplitude of the fully polarized spin echo train is normalized to 1.

Figure 4:
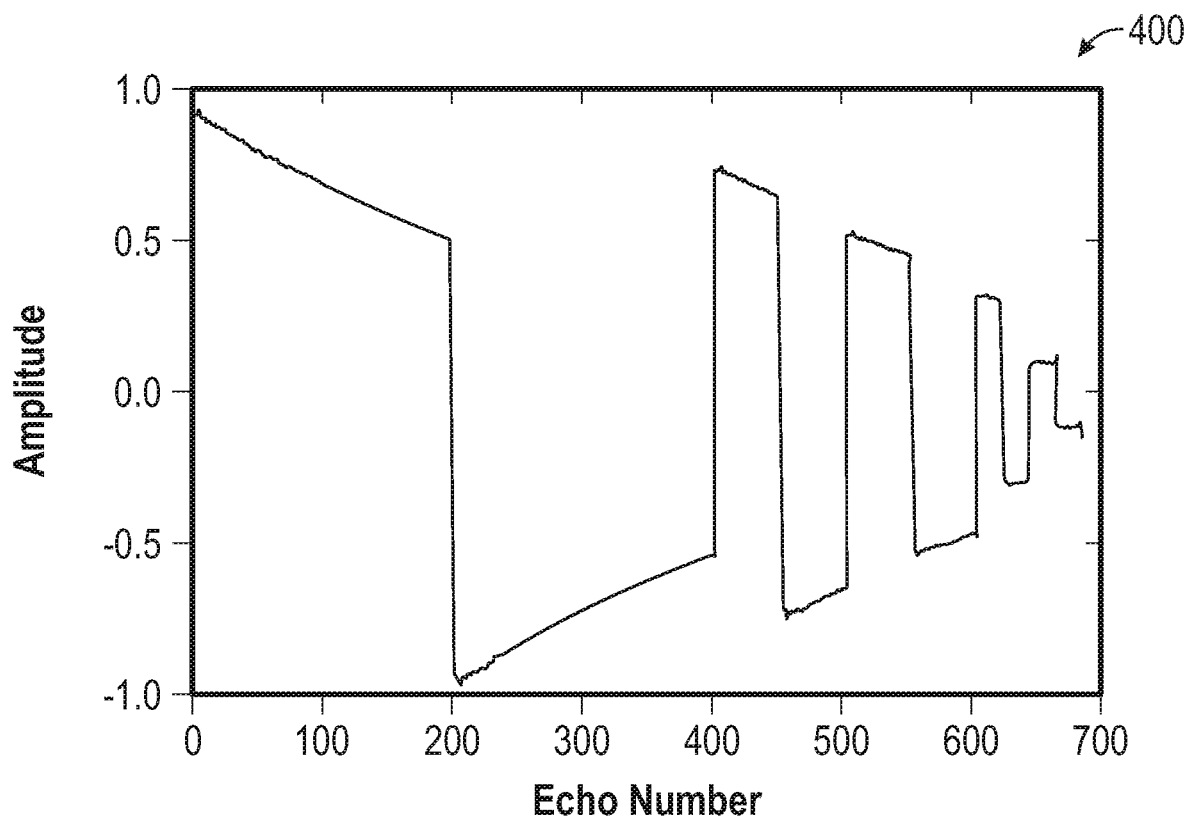
FIG. 4 illustrates a plot depicting an example of a T1/T2 pulse sequence using different wait times in accordance with one or more implementations.

FIG. 4 illustrates a plot 400 depicting an example of a T1/T2 pulse sequence using different wait times in accordance with one or more implementations. In FIG. 4, the plot 400 pictorially shows one PAP after another, where each PAP employs different wait times and different number of echoes to thereby form a T1/T2 pulse sequence. As depicted in the plot 400, the wait times are in decreasing order. For example, the simulation parameters associated with the plot 400 may be as follows: T1=T2=100 ms, TE for all echo trains=0.3 ms, number of echoes (NE) used=200, 50, 50, 20, 20, respectively, and wait times (TW) used=230.3 ms, 120.4 ms, 69.3 ms, 35.7 ms, 10.5 ms, respectively. In some implementations, other wait times may be employed in the pulse sequence without departing from the scope of the disclosure.

Figure 5:
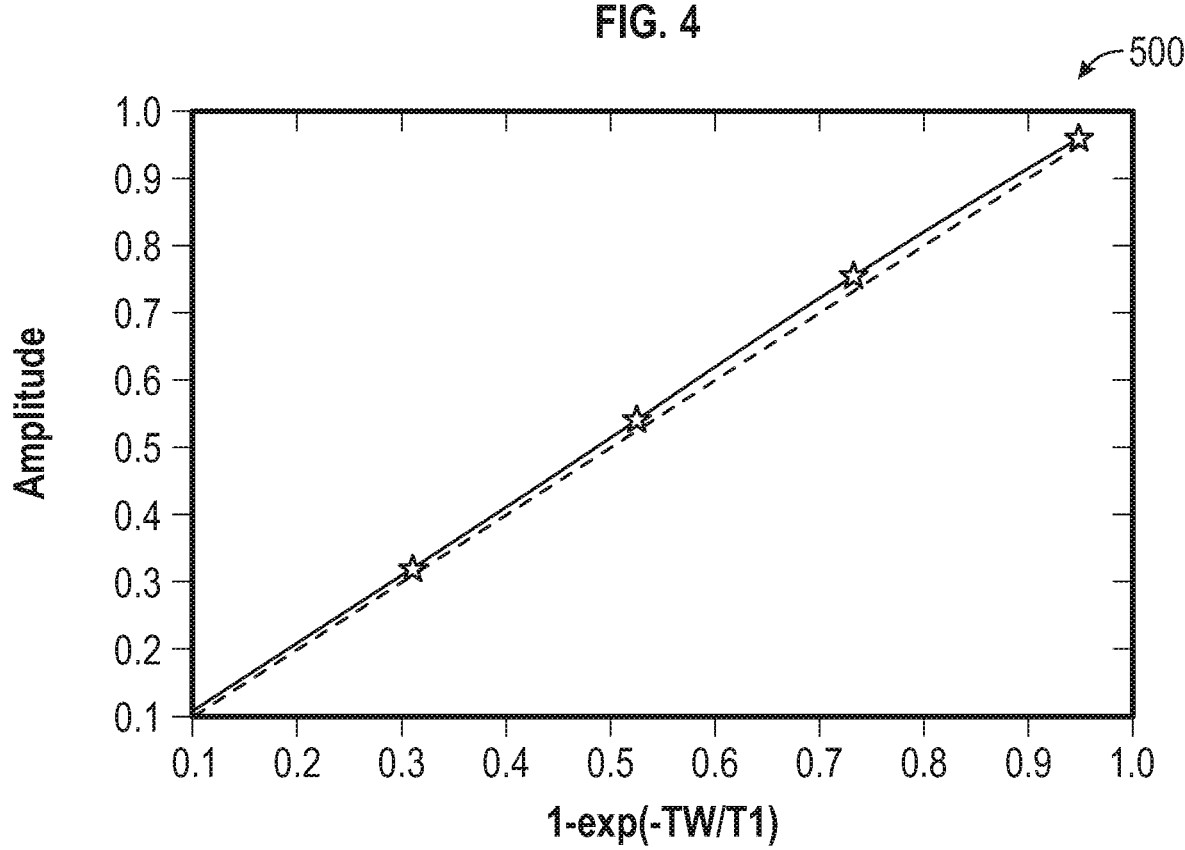
FIG. 5 illustrates a plot depicting a correlation between echo train amplitudes of the T1/T2 pulse sequence in FIG. 4 and theoretically predicted echo amplitudes in accordance with one or more implementations.

FIG. 5 illustrates a plot 500 depicting a correlation between echo train amplitudes of the T1/T2 pulse sequence in FIG. 4 and theoretically predicted echo amplitudes in accordance with one or more implementations. In FIG. 5, the trainlet amplitudes have a strong correlation with the theoretically predicted trainlet amplitudes, although the different wait times are in decreasing order.

Figure 6:
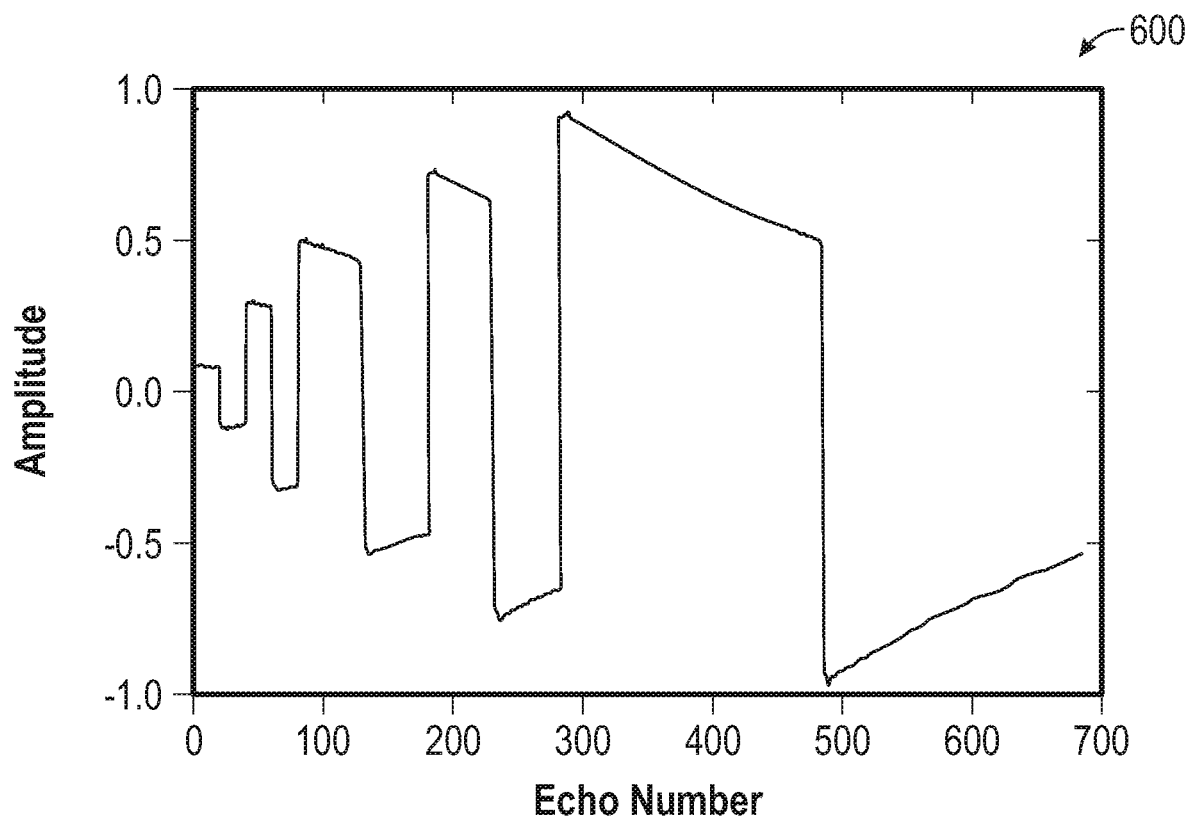
FIG. 6 illustrates a plot depicting an example of a T1/T2 pulse sequence using different wait times in accordance with one or more implementations.

FIG. 6 illustrates a plot 600 depicting an example of a T1/T2 pulse sequence using different wait times in accordance with one or more implementations. In FIG. 6, the plot 600 pictorially shows one PAP after another, where each PAP employs different wait times and different number of echoes to thereby form a T1/T2 pulse sequence. As depicted in the plot 600, the wait times are in increasing order. For example, the simulation parameters associated with the plot 600 may be as follows: T1=T2=100 ms, TE for all echo trains=0.3 ms, number of echoes (NE) used=20, 20, 50, 50, 200, respectively, and wait times (TW) used=10.5 ms, 35.7 ms, 69.3 ms, 120.4 ms, 230.3 ms, respectively. In some implementations, other wait times may be employed in the pulse sequence without departing from the scope of the disclosure.

Figure 7:
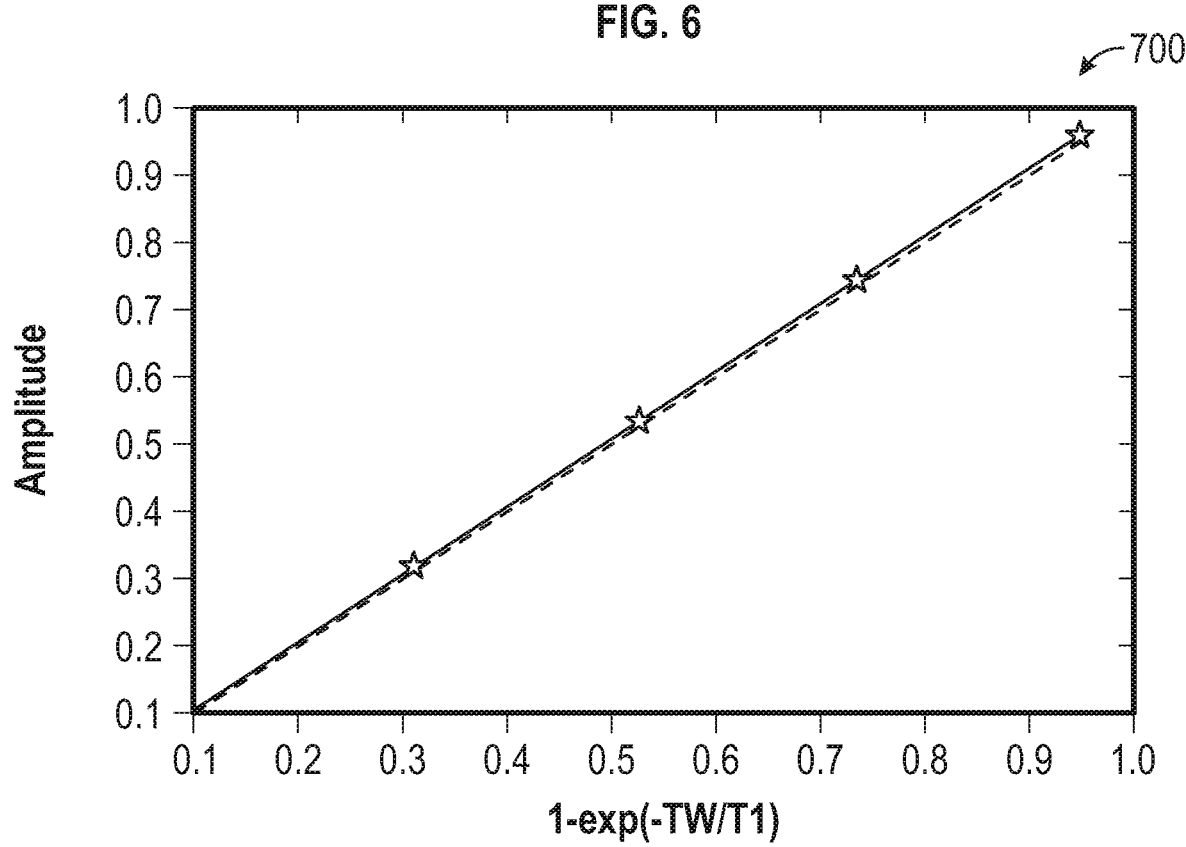
FIG. 7 illustrates a plot depicting a correlation between echo train amplitudes of the T1/T2 pulse sequence in FIG. 6 and theoretically predicted echo amplitudes in accordance with one or more implementations.

FIG. 7 illustrates a plot 700 depicting a correlation between echo train amplitudes of the T1/T2 pulse sequence in FIG. 6 and theoretically predicted echo amplitudes in accordance with one or more implementations. In FIG. 7, the trainlet amplitudes have a strong correlation with the theoretically predicted trainlet amplitudes, although the different wait times are in increasing order.

In one or more implementations, an optional preparation pulse or multiple optional preparation pulses can be added before a wait time. In some aspects, the pulse sequence with the optional preparation pulse can be expressed as equation (5) as follows:

$$[(\text{prep}_1 - TW_1\text{-spin echoes}_1)_{+/-} - (\text{prep}_2 - TW_2\text{-spin echoes}_2)_{+/-} - \ldots - (\text{prep}_n - TW_n\text{-spin echoes}_n)_{+/-}]_m \quad \text{Eq. (5)}$$

where the +/− denotes an immediate repetition of a pulse sequence but with the phase of one or more of the pulses in the preparation pulses and/or the pulses in the spin echo trains switched 180 degrees. In particular, such preparation pulses can be a saturation pulse, an inversion pulse, or hybrid saturation-inversion pulse, or any other preparation pulse without departing from the scope of the disclosure. In this respect, the interspersing of different wait times into the pulse sequences that employ the optional preparation pulses can still yield a strong correlation between the echo train amplitudes and the theoretically predicted echo amplitudes.

Figure 8:
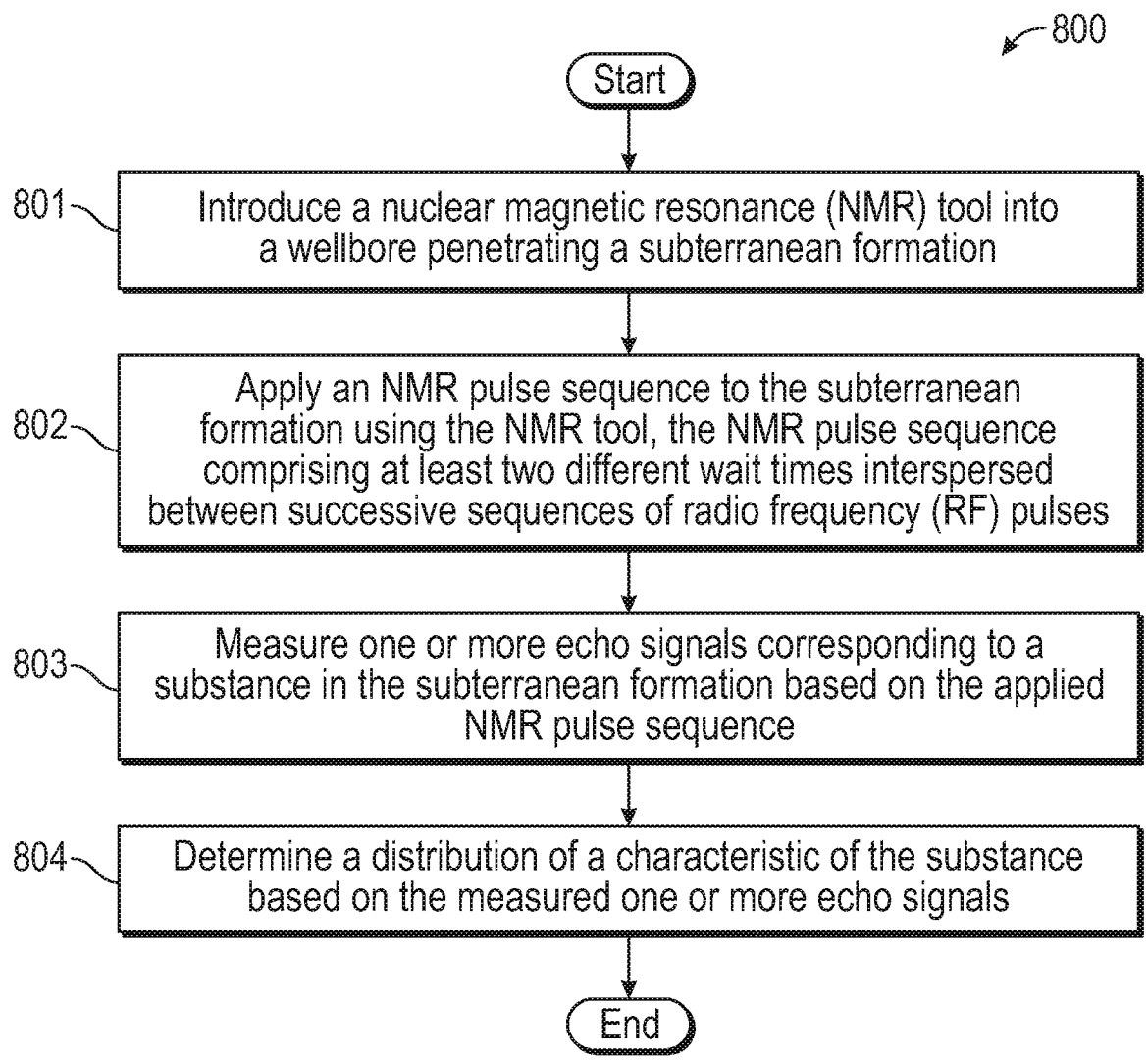
FIG. 8 illustrates a flowchart of an example process for interspersing different wait times in a pulse sequence in accordance with one or more implementations.

FIG. 8 illustrates a flowchart of an example process 800 for interspersing different wait times in a pulse sequence in accordance with one or more implementations. For explanatory purposes, the example process 800 is described herein with reference to the NMR logging system 908 that includes the logging tool 902 and the computing subsystem 910 of FIG. 9A; however, the example process 800 is not limited to the logging tool 902 and computing subsystem 910 of FIG. 9A, and one or more blocks of the example process 800 may be performed by one or more other components of the NMR logging system 908. Further for explanatory purposes, the blocks of the example process 800 are described herein as occurring in serial, or linearly. However, multiple blocks of the example process 800 may occur in parallel. In addition, the blocks of the example process 800 need not be performed in the order shown and/or one or more of the blocks of the example process 800 need not be performed.

The example process 800 begins, at step 801, where a NMR tool is introduced into a wellbore penetrating a subterranean formation. Next, at step 802, the logging tool 902 applies an NMR pulse sequence to the subterranean formation, in which the NMR pulse sequence includes at least two different wait times interspersed between successive sequences of radio frequency (RF) pulses. Subsequently, at step 803, the logging tool 902 measures one or more echo signals corresponding to a substance in the subterranean formation based on the inserted NMR pulse sequence. Next, at step 804, the logging tool 902 and the computing subsystem 910, individually and/or in combination, determine a distribution of a characteristic of the substance based on the measured one or more echo signals. In some aspects, each of the successive sequences of radio frequency (RF) pulses comprises CPMG sequence. In one or more implementations, method also includes drilling the wellbore, in which the NMR tool is a logging while drilling (LWD) NMR tool.

In applying the NMR pulse sequence, the logging tool 902 applies a first wait time of a first duration, applies a first sequence of RF pulses subsequent to the first wait time, applies a second wait time of a second duration subsequent to the first sequence of RF pulses, and applies a second sequence of RF pulses subsequent to the second wait time, in which the second duration is different from the first duration.

In applying the NMR pulse sequence, the logging tool 902 may apply a first phase alternated pair (PAP), and may apply a second PAP subsequent to the first PAP, in which the first PAP includes a first wait time of a first duration and a first sequence of RF pulses, the second PAP includes a second wait time of a second duration and a second sequence of RF pulses. In some aspects, the second duration is different from the first duration. In other aspects, the first PAP and the second PAP comprise a different number of echoes.

In applying the NMR pulse sequence, the logging tool 902 may apply a third PAP subsequent to the second PAP, in which the third PAP comprises a third wait time of a third duration and a third sequence of RF pulses. In some aspects, the third duration is different from the first duration and the second duration. In some implementations, the first PAP includes a first number of echoes, the second PAP includes a second number of echoes, and the third PAP includes a third number of echoes. In some aspects, the first duration is greater than the second duration, and the second duration is greater than the third duration (i.e., decreasing order). In some aspects, the first number of echoes is greater than the second number of echoes, and the second number of echoes is greater than the third number of echoes. In some aspects, the third duration is greater than the second duration, and the second duration is greater than the first duration (i.e., increasing order). In some aspects, the third number of echoes is greater than the second number of echoes, and the second number of echoes is greater than the first number of echoes.

In applying the NMR pulse sequence, the logging tool 902 may apply a plurality of phase alternated pairs comprising different wait times and different number of echoes, in which each of the plurality of phase alternated pairs comprises two sequences of RF pulses of opposite phase.

In measuring the one or more echo signals, the logging tool 902 measures an amplitude for each of the one or more echo signals. In turn, the computing subsystem 910 may determine that the measured amplitude of each of the one or more echo signals corresponds to a predetermined amplitude.

In some aspects, the NMR pulse sequence comprises a preparation pulse prior to a wait time in the NMR pulse sequence. In some aspects, the preparation pulse comprises one or more saturation pulses, one or more inversion pulses, or one or more hybrid saturation-inversion pulses.

Figure 9A:
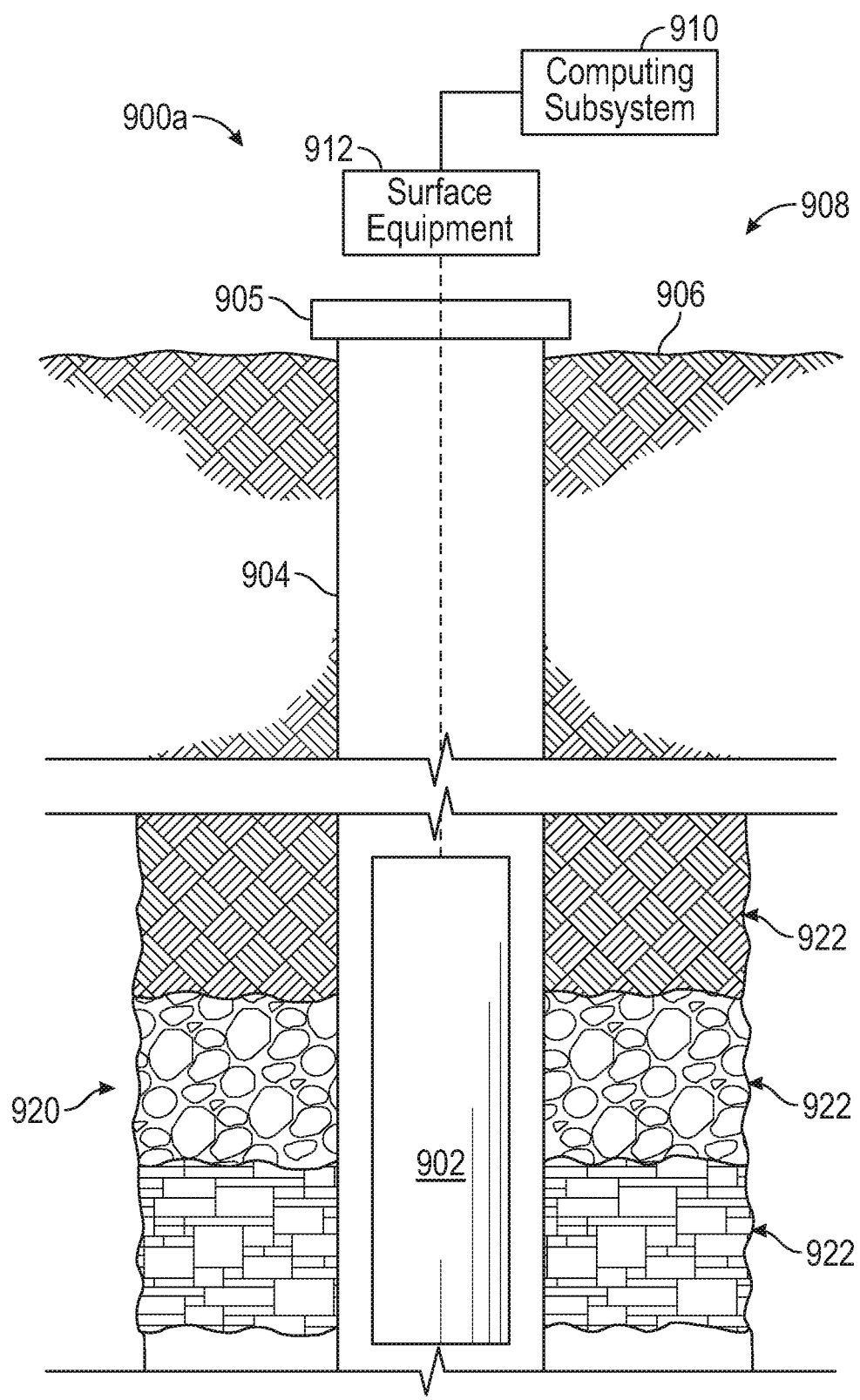
FIG. 9A illustrates a schematic view of a NMR logging operation deployed in and around a well system in accordance with one or more implementations.

FIG. 9A depicts a schematic view of a NMR logging operation deployed in and around a well system 900a, according to one or more implementations. The well system 900a includes an NMR logging system 908 and a subterranean region 920 beneath the ground surface 906. The well system 900a can also include additional or different features that are not shown in FIG. 9A. For example, the well system 900a can include additional drilling system components, wireline logging system components, or other components.

The subterranean region 920 includes all or part of one or more subterranean formations or zones. The subterranean region 920 shown in FIG. 9A, for example, includes multiple subsurface layers 922. The subsurface layers 922 can include sedimentary layers, rock layers, sand layers, or any combination thereof and other types of subsurface layers. One or more of the subsurface layers can contain fluids, such as brine, oil, gas, or combinations thereof. A wellbore 904 penetrates through the subsurface layers 922. Although the wellbore 904 shown in FIG. 9A is a vertical wellbore, the NMR logging system 908 can also be implemented in other wellbore orientations. For example, the NMR logging system 908 may be adapted for horizontal wellbores, slant wellbores, curved wellbores, vertical wellbores, or any combination thereof.

The NMR logging system 908 also includes a logging tool 902, surface equipment 912, and a computing subsystem 910. In the shown in FIG. 9A, the logging tool 902 is a downhole logging tool that operates while disposed in the wellbore 904. The surface equipment 912 shown in FIG. 9A operates at or above the surface 906, for example, near the well head 905, to control the logging tool 902 and possibly other downhole equipment or other components of the well system 900a. The computing subsystem 910 receives and analyzes logging data from the logging tool 902. An NMR logging system can include additional or different features, and the features of an NMR logging system can be arranged and operated as represented in FIG. 9A or in another manner.

All or part of the computing subsystem 910 can be implemented as a component of, or integrated with one or more components of, the surface equipment 912, the logging tool 902, or both. For example, the computing subsystem 910 can be implemented as one or more computing structures separate from but communicative with the surface equipment 912 and the logging tool 902.

The computing subsystem 910 can be embedded in the logging tool 902 (not shown), and the computing subsystem 910 and the logging tool 902 operate concurrently while disposed in the wellborn 904. For example, although the computing subsystem 910 is shown above the surface 906 in FIG. 9A, all or part of the computing subsystem 910 may reside below the surface 906, for example, at or near the location of the logging tool 902.

The well system 900a includes communication or telemetry equipment that allows communication among the computing subsystem 910, the logging tool 902, and other components of the NMR logging system 908. For example, each of the components of the NMR logging system 908 can include one or more transceivers or similar apparatus for wired or wireless data communication among the various components. The NMR logging system 908 can include, but is not limited to, one or more systems and/or apparatus for wireline telemetry, wired pipe telemetry, mud pulse telemetry, acoustic telemetry, electromagnetic telemetry, or any combination of these and other types of telemetry. In some embodiments, the logging tool 902 receives commands, status signals, or other types of information from the computing subsystem 910 or another source. The computing subsystem 910 can also receive logging data, status signals, or other types of information from the logging tool 902 or another source.

NMR logging operations are performed in connection with various types of downhole operations at various stages in the lifetime of a well system and therefore structural attributes and components of the surface equipment 912 and logging tool 902 are adapted for various types of NMR logging operations. For example, NMR logging may be performed during drilling operations, during wireline logging operations, or in other contexts. As such, the surface equipment 912 and the logging tool 902 can include or operate in connection with drilling equipment, wireline logging equipment, or other equipment for other types of operations.

Figure 9B:
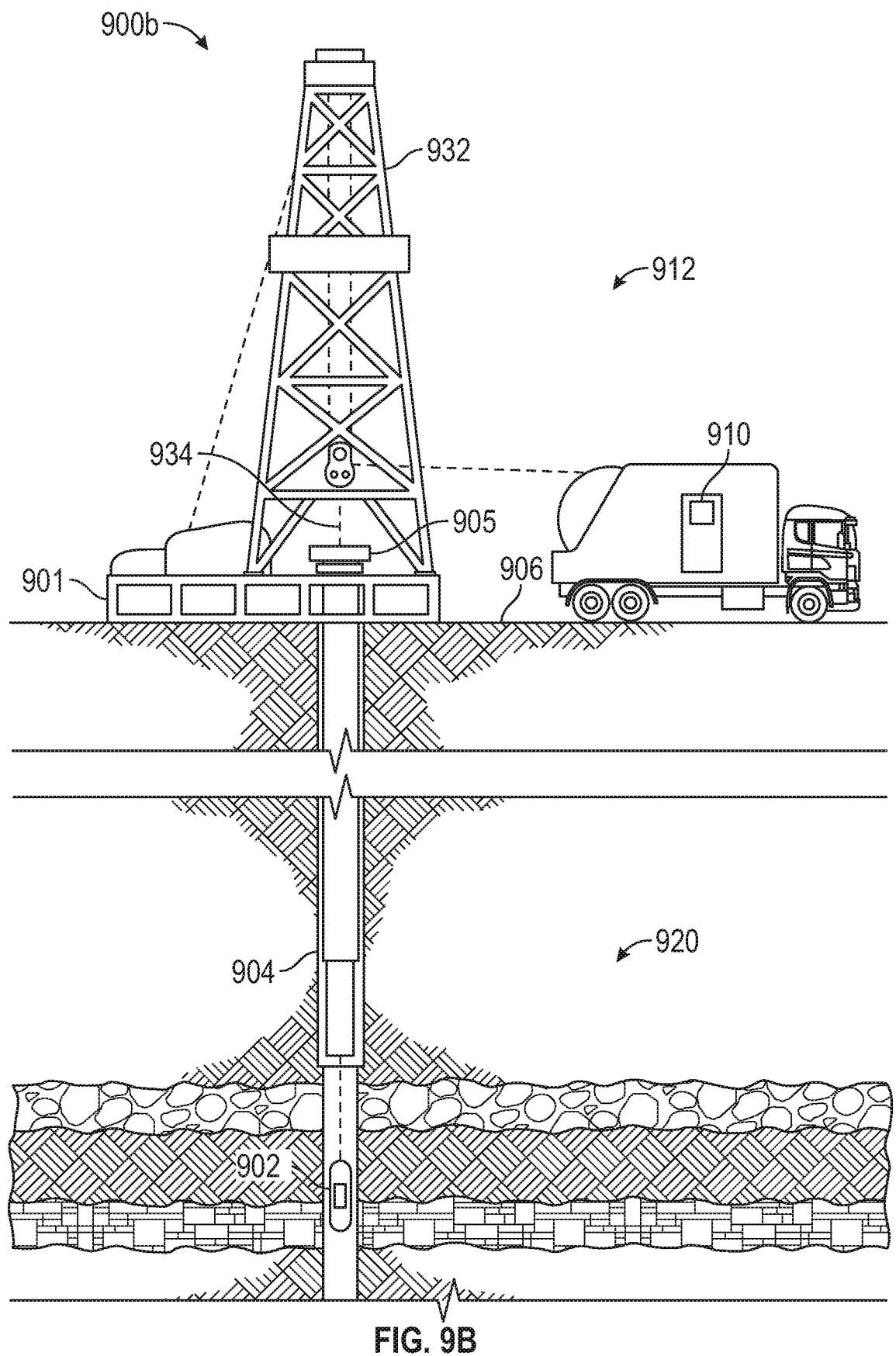
FIG. 9B illustrates a schematic view of a wireline NMR logging operation deployed in and around a well system in accordance with one or more implementations.

FIG. 9B depicts a schematic view of a wireline NMR logging operation deployed in and around a well system 900b, according to one or more implementations. The well system 900b includes the NMR logging tool 902 in a wireline logging environment. The surface equipment 912 includes, but is not limited to, a platform 901 disposed above the surface 906 equipped with a derrick 932 that supports a wireline cable 934 extending into the wellbore 904. Wireline logging operations are performed, for example, after a drill string is removed from the wellbore 904, to allow the wireline logging tool 902 to be lowered by wireline or logging cable into the wellbore 904.

Figure 9C:
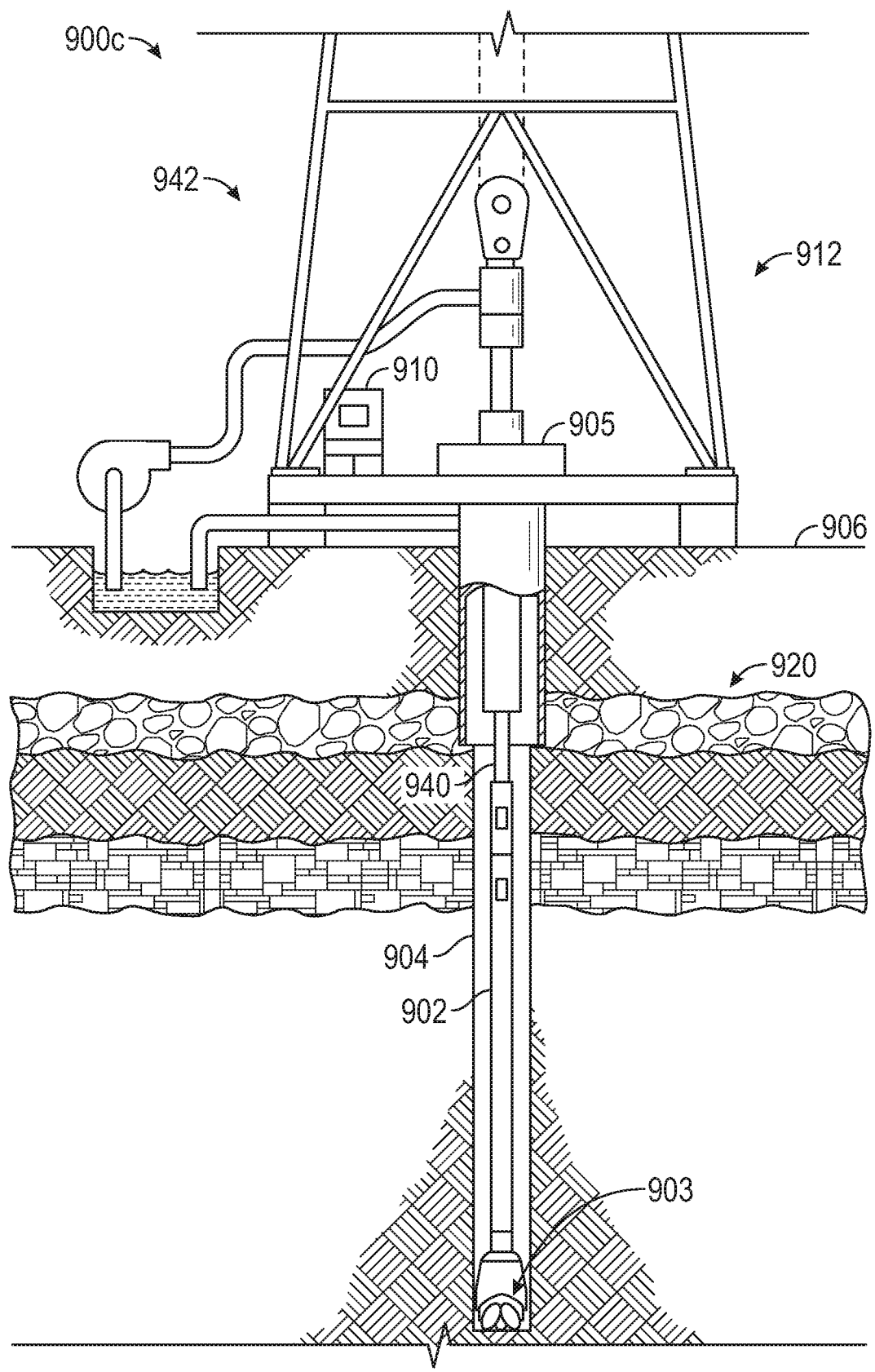
FIG. 9C illustrates a schematic view of a well system that includes the NMR logging tool in a logging while drilling (LWD) environment in accordance with one or more implementations.

FIG. 9C depicts a schematic view of a well system 900c that includes the NMR logging tool 902 performing a logging operation (e.g., logging-while-drilling (LWD) measurements), according to one or more implementations. It should be noted that while FIG. 9C generally depicts a land-based drilling assembly, those skilled in the art will readily recognize that the principles described herein are equally applicable to subsea drilling operations that employ floating or sea-based platforms and rigs, without departing from the scope of the disclosure.

NMR logging operations is performed during drilling operations. Drilling is performed using a string of drill pipes connected together to form a drill string 940 that is lowered through a rotary table into the wellbore 904. A drilling rig 942 at the surface 906 supports the drill string 940, as the drill string 940 is operated to drill a wellbore penetrating the subterranean region 920. The drill string 940 can include, for example, but is not limited to, a kelly, a drill pipe, a bottom hole assembly, and other components. The bottomhole assembly on the drill string can include drill collars, drill bits, the logging tool 902, and other components. Exemplary logging tools can be or include, but are not limited to, measuring while drilling (MWD) tools and LWD tools.

The logging tool 902 includes an NMR tool for obtaining NMR measurements from the subterranean region 920. As shown, for example, in FIG. 9B, the logging tool 902 is suspended in the wellbore 904 by a coiled tubing, wireline cable, or another structure or conveyance that connects the tool to a surface control unit or other components of the surface equipment 912.

The logging tool 902 is lowered to the bottom of a region of interest and subsequently pulled upward (e.g., at a substantially constant speed) through the region of interest. As shown, for example, in FIG. 9C, the logging tool 902 is deployed in the wellbore 904 on jointed drill pipe, hard wired drill pipe, or other deployment hardware. In other example implementations, the logging tool 902 collects data during drilling operations as it moves downward through the region of interest. The logging tool 902 may also collect data while the drill string 940 is moving, for example, while the logging tool 902 is being tripped in or tripped out of the wellbore 904.

The logging tool 902 may also collect data at discrete logging points in the wellbore 904. For example, the logging tool 902 moves upward or downward incrementally to each logging point at a series of depths in the wellbore 904. At each logging point, instruments in the logging tool 902 perform measurements on the subterranean region 920. The logging tool 902 also obtains measurements while the logging tool 902 is moving (e.g., being raised or lowered). The measurement data is communicated to the computing subsystem 910 for storage, processing, and analysis. Such data may be gathered and analyzed during drilling operations (e.g., LWD operations), during wireline logging operations, other conveyance operations, or during other types of activities.

The computing subsystem 910 receives and analyzes the measurement data from the logging tool 902 to detect properties of various subsurface layers 922. For example, the computing subsystem 910 can identify the density, material content, and/or other properties of the subsurface layers 922 based on the NMR measurements acquired by the logging tool 902 in the wellbore 904.

The logging tool 902 obtains NMR signals by polarizing nuclear spins in the formation 920 and pulsing the nuclei with a radio frequency (RF) magnetic field. Various pulse sequences (i.e., series of radio frequency pulses, delays, and other operations) are used to obtain NMR signals, including the CPMG sequence (in which the spins are first tipped using a tipping pulse followed by a series of refocusing pulses), a saturation recovery pulse sequence, and other pulse sequences.

Figure 10:
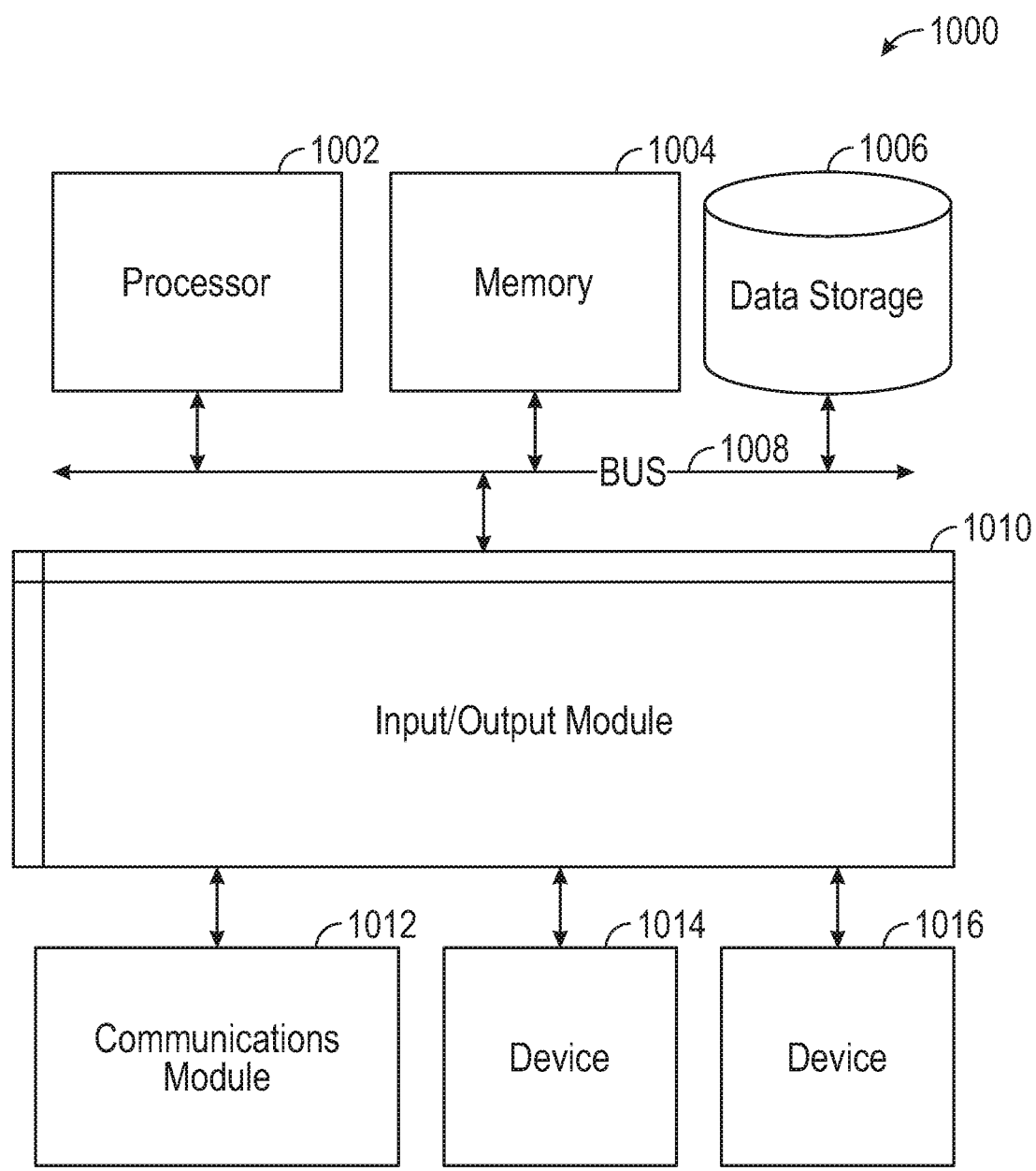
FIG. 10 is a block diagram illustrating an example computer system with which the computing subsystem of FIG. 9A can be implemented.

FIG. 10 is a block diagram illustrating an exemplary computer system 1000 with which the computing subsystem 910 of FIG. 9A can be implemented. In certain aspects, the computer system 1000 may be implemented using hardware or a combination of software and hardware, either in a dedicated server, integrated into another entity, or distributed across multiple entities.

Computer system 1000 (e.g., computing subsystem 910) includes a bus 1008 or other communication mechanism for communicating information, and a processor 1002 coupled with bus 1008 for processing information. By way of example, the computer system 1000 may be implemented with one or more processors 1002. Processor 1002 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1000 can include, in addition to hardware, code that creates an execution environment for the computer program in question, e.g., code that constitutes processor firmware, a protocol stack, a database management system, an operating system, or a combination of one or more of them stored in an included memory 1004, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1008 for storing information and instructions to be executed by processor 1002. The processor 1002 and the memory 1004 can be supplemented by, or incorporated in, special purpose logic circuitry.

The instructions may be stored in the memory 1004 and implemented in one or more computer program products. i.e., one or more modules of computer program instructions encoded on a computer readable medium for execution by, or to control the operation of, the computer system 1000, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Per, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1004 may also be used for storing temporary variable or other intermediate information during execution of instructions to be executed by processor 1002.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1000 further includes a data storage device 1006 such as a magnetic disk or optical disk, coupled to bus 1008 for storing information and instructions. Computer system 1000 may be coupled via input/output module 1010 to various devices. The input/output module 1010 can be any input/output module. Exemplary input/output modules 1010 include data ports such as USB ports. The input/output module 1010 is configured to connect to a communications module 1012. Exemplary communications modules 1012 include networking interface cards, such as Ethernet cards and modems. In certain aspects, the input/output module 1010 is configured to connect to a plurality of devices, such as an input device 1014 and/or an output device 1016. Exemplary input devices 1014 include a keyboard and a pointing device, e.g., a mouse or a trackball, by which a user can provide input to the computer system 1000. Other kinds of input devices 1014 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 1016 include display devices such as a LCD (liquid crystal display) monitor, for displaying information to the user.

According to one aspect of the present disclosure, the computing subsystem 910 can be implemented using a computer system 1000 in response to processor 1002 executing one or more sequences of one or more instructions contained in memory 1004. Such instructions may be read into memory 1004 from another machine-readable medium, such as data storage device 1006. Execution of the sequences of instructions contained in the main memory 1004 causes processor 1002 to perform the process steps described herein. One or more processors in a multi-processing arrangement may also be employed to execute the sequences of instructions contained in the memory 1004. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 1000 can include clients and servers. A client and server are generally remote from each other and typically interact through a communication network. The relationship of client and server arises by virtue of computer programs running on the respective computers and having a client-server relationship to each other. Computer system 1000 can be, for example, and without limitation, a desktop computer, laptop computer, or tablet computer. Computer system 1000 can also be embedded in another device, for example, and without limitation, a mobile telephone such as a smartphone.

The term "machine-readable storage medium" or "computer readable medium" as used herein refers to any medium or media that participates in providing instructions to processor 1002 for execution. Such a medium may take many forms, including, but not limited to, non-volatile media, volatile media, and transmission media. Non-volatile media include, for example, optical or magnetic disks, such as data storage device 1006. Volatile media include dynamic memory, such as memory 1004. Transmission media include coaxial cables, copper wire, and fiber optics, including the wires that comprise bus 1008. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

Various examples of aspects of the disclosure are described below. These are provided as examples, and do not limit the subject technology.

A method includes introducing a NMR tool into a wellbore penetrating a subterranean formation. The method includes applying an NMR pulse sequence to the subterranean formation using the NMR tool, in which the NMR pulse sequence includes at least two different wait times interspersed between successive sequences of radio frequency (RF) pulses. The method includes measuring one or more echo signals corresponding to a substance in the subterranean formation based on the applied NMR pulse sequence. The method also includes determining a distribution of a characteristic of the substance based on the measured one or more echo signals.

In applying the NMR pulse sequence, the method includes applying a first wait time of a first duration; applying a first sequence of RF pulses subsequent to the first wait time; applying a second wait time of a second duration subsequent to the first sequence of RF pulses; and applying a second sequence of RF pulses subsequent to the second wait time, in which the second duration is different from the first duration.

In applying the NMR pulse sequence, the method includes applying a first phase alternated pair (PAP); and applying a second PAP subsequent to the first PAP, in which the first PAP comprises a first wait time of a first duration and a first sequence of RF pulses, the second PAP comprises a second wait time of a second duration and a second sequence of RF pulses, and the second duration is different from the first duration. In some aspects, the first PAP and the second PAP comprise a different number of echoes.

In applying the NMR pulse sequence, the method includes applying a third PAP subsequent to the second PAP, in which the third PAP comprises a third wait time of a third duration and a third sequence of RF pulses, the third duration is different from the first duration and the second duration, and the first PAP comprises a first number of echoes, the second PAP comprises a second number of echoes, and the third PAP comprises a third number of echoes. In some aspects, the first duration is greater than the second duration, and the second duration is greater than the third duration. In some aspects, the first number of echoes is greater than the second number of echoes, and the second number of echoes is greater than the third number of echoes. In some aspects, the third duration is greater than the second duration, and the second duration is greater than the first duration. In some aspects, the third number of echoes is greater than the second number of echoes, and the second number of echoes is greater than the first number of echoes.

In applying the NMR pulse sequence, the method includes applying a plurality of phase alternated pairs comprising different wait times and different number of echoes, in which each of the plurality of phase alternated pairs comprises two sequences of RF pulses of opposite phase.

In measuring the one or more echo signals, the method includes measuring an amplitude for each of the one or more echo signals, and determining that the measured amplitude of each of the one or more echo signals corresponds to a predetermined amplitude.

In some aspects, the NMR pulse sequence comprises a preparation pulse prior to a wait time in the NMR pulse sequence. In some aspects, the preparation pulse comprises one or more saturation pulses, one or more inversion pulses, or one or more hybrid saturation-inversion pulses.

In some aspects, each of the successive sequences of radio frequency (RF) pulses comprises a CPMG sequence.

The method also includes drilling the wellbore, in which the NMR tool is a logging while drilling (LWD) NMR tool.

A system includes a NMR tool, a processing unit, and a memory communicably coupled to the NMR tool, in which the memory stores instructions that, when executed by the processing unit, cause the processing unit to apply an NMR pulse sequence to a subterranean formation using the NMR tool, the NMR pulse sequence comprising at least two different wait times interspersed between successive sequences of radio frequency (RF) pulses, measure one or more echo signals corresponding to a substance in the subterranean formation based on the applied NMR pulse sequence, and determine a distribution of a characteristic of the substance based on the measured one or more echo signals.

In some aspects, the instructions cause the processing unit to apply a first wait time of a first duration; apply a first sequence of RF pulses subsequent to the first wait time; apply a second wait time of a second duration subsequent to the first sequence of RF pulses; apply a second sequence of RF pulses subsequent to the second wait time; apply a third wait time of a third duration subsequent to the second sequence of RF pulses; and apply a third sequence of RF pulses subsequent to the third wait time, in which the first sequence of RF pulses comprises a first number of echoes, the second sequence of RF pulses comprises a second number of echoes, and the third sequence of RF pulses comprises a third number of echoes.

In some aspects, the first duration is greater than the second duration, and the second duration is greater than the third duration. In other aspects, the first number of echoes is greater than the second number of echoes, and the second number of echoes is greater than the third number of echoes. In some aspects, the third duration is greater than the second duration, and the second duration is greater than the first duration. In other aspects, the third number of echoes is greater than the second number of echoes, and the second number of echoes is greater than the first number of echoes. In some aspects, the NMR pulse sequence comprises a preparation pulse prior to a wait time in the NMR pulse sequence. In other aspects, the preparation pulse comprises one or more saturation pulses, one or more inversion pulses, or one or more hybrid saturation-inversion pulses.

In one or more aspects, examples of clauses are described below.

A method comprising one or more methods, operations or portions thereof described herein.

An apparatus comprising one or more memories and one or more processors (e.g., 1000), the one or more processors configured to cause performing one or more methods, operations or portions thereof described herein.

An apparatus comprising one or more memories (e.g., 1004, one or more internal, external or remote memories, or one or more registers) and one or more processors (e.g., 1002) coupled to the one or more memories, the one or more processors configured to cause the apparatus to perform one or more methods, operations or portions thereof described herein.

An apparatus comprising means (e.g., 1000) adapted for performing one or more methods, operations or portions thereof described herein.

A processor (e.g., 1002) comprising modules for carrying out one or more methods, operations or portions thereof described herein.

A hardware apparatus comprising circuits (e.g., 1000) configured to perform one or more methods, operations or portions thereof described herein.

An apparatus comprising means (e.g., 1000) adapted for performing one or more methods, operations or portions thereof described herein.

An apparatus comprising components (e.g., 1000) operable to carry out one or more methods, operations or portions thereof described herein.

A computer-readable storage medium (e.g., 1004, one or more internal, external or remote memories, or one or more registers) comprising instructions stored therein, the instructions comprising code for performing one or more methods or operations described herein.

A computer-readable storage medium (e.g., 1004, one or more internal, external or remote memories, or one or more registers) storing instructions that, when executed by one or more processors, cause one or more processors to perform one or more methods, operations or portions thereof described herein.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the subject technology. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B. and C" or "at least one of A, B, or C" refers to only A, only B, or only C; any combination of A, B. and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

Therefore, the subject technology is well adapted to attain the ends and advantages mentioned as well as those that are inherent therein. The particular embodiments disclosed above are illustrative only, as the subject technology may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the subject technology. The subject technology illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b." or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
    applying a nuclear magnetic resonance (NMR) pulse sequence into a wellbore penetrating a subterranean formation using a NMR tool, the NMR pulse sequence comprising at least two different wait times repeatably interspersed between a plurality of successive sequences of radio frequency (RF) pulses, wherein each of the successive sequences of radio frequency pulses includes using each of the at least two different wait times interspersed between separate applications of a trianlet of echo signals into the formation next to the wellbore and prior to any repeats of the application of a successive sequence of radio frequency pulses;
    measuring one or more echo signals corresponding to a substance in the subterranean formation based on the applied NMR pulse sequence; and
    determining a distribution of a characteristic of the substance based on the measured one or more echo signals.

2. The method of claim 1, wherein applying the NMR pulse sequence comprises:
    applying a first wait time of a first duration;
    applying a first sequence of RF pulses subsequent to the first wait time;
    applying a second wait time of a second duration subsequent to the first sequence of RF pulses; and
    applying a second sequence of RF pulses subsequent to the second wait time,
    wherein the second duration is different from the first duration.

3. The method of claim 1, wherein applying the NMR pulse sequence comprises:
    applying a first phase alternated pair (PAP); and
    applying a second PAP subsequent to the first PAP,
    wherein the first PAP comprises a first wait time of a first duration and a first sequence of RF pulses,
    wherein the second PAP comprises a second wait time of a second duration and a second sequence of RF pulses, and
    wherein the second duration is different from the first duration.

4. The method of claim 3, wherein the first PAP and the second PAP comprise a different number of echoes.

5. The method of claim 3, wherein applying the NMR pulse sequence comprises:
    applying a third PAP subsequent to the second PAP,
    wherein the third PAP comprises a third wait time of a third duration and a third sequence of RF pulses,
    wherein the third duration is different from the first duration and the second duration, and
    wherein the first PAP comprises a first number of echoes, the second PAP comprises a second number of echoes, and the third PAP comprises a third number of echoes.

6. The method of claim 5, wherein the first duration is greater than the second duration, and the second duration is greater than the third duration.

7. The method of claim 6, wherein the first number of echoes is greater than the second number of echoes, and the second number of echoes is greater than the third number of echoes.

8. The method of claim 5, wherein the third duration is greater than the second duration, and the second duration is greater than the first duration.

9. The method of claim 8, wherein the third number of echoes is greater than the second number of echoes, and the second number of echoes is greater than the first number of echoes.

10. The method of claim 1, wherein applying the NMR pulse sequence comprises:
    applying a plurality of phase alternated pairs comprising different wait times and different number of echoes,
    wherein each of the plurality of phase alternated pairs comprises two sequences of RF pulses of opposite phase.

11. The method of claim 1, wherein the NMR pulse sequence comprises a preparation pulse prior to a wait time in the NMR pulse sequence.

12. The method of claim 11, wherein the preparation pulse comprises one or more saturation pulses, one or more inversion pulses, or one or more hybrid saturation-inversion pulses.

13. The method of claim 1, wherein each of the successive sequences of radio frequency (RF) pulses comprises a Carr-Purcell-Meiboom-Gill (CPMG) sequence.

14. The method of claim 1, further comprising:
    drilling the wellbore, wherein the NMR tool is a logging while drilling (LWD) NMR tool.

15. A system comprising:
    a nuclear magnetic resonance (NMR) tool;
    a processing unit; and
    a memory communicably coupled to the NMR tool, wherein the memory stores instructions that, when executed by the processing unit, cause the processing unit to:
    apply a NMR pulse sequence into a wellbore penetrating a subterranean formation using the NMR tool, the NMR pulse sequence comprising at least two different wait times repeatedly interspersed between a plurality of successive sequences of radio frequency (RF) pulses, wherein each of the successive sequences of radio frequency pulses includes using each of the at least two different wait times interspersed between separate applications of a trianlet of echo signals into the formation next to the wellbore and prior to any repeats of the application of a successive sequence of radio frequency pulses;

measure one or more echo signals corresponding to a substance in the subterranean formation based on the applied NMR pulse sequence; and determine a distribution of a characteristic of the substance based on the measured one or more echo signals.

16. The system of claim 15, wherein the instructions cause the processing unit to:

apply a first wait time of a first duration;

apply a first sequence of RF pulses subsequent to the first wait time;

apply a second wait time of a second duration subsequent to the first sequence of RF pulses;

apply a second sequence of RF pulses subsequent to the second wait time;

apply a third wait time of a third duration subsequent to the second sequence of RF pulses; and apply a third sequence of RF pulses subsequent to the third wait time, wherein the first sequence of RF pulses comprises a first number of echoes, the second sequence of RF pulses comprises a second number of echoes, and the third sequence of RF pulses comprises a third number of echoes.

17. The system of claim 16, wherein the first duration is greater than the second duration, and the second duration is greater than the third duration, and wherein the first number of echoes is greater than the second number of echoes, and the second number of echoes is greater than the third number of echoes.

18. The system of claim 16, wherein the third duration is greater than the second duration, and the second duration is greater than the first duration, and wherein the third number of echoes is greater than the second number of echoes, and the second number of echoes is greater than the first number of echoes.

19. The system of claim 15, wherein the NMR pulse sequence comprises a preparation pulse prior to a wait time in the NMR pulse sequence, and wherein the preparation pulse comprises one or more saturation pulses, one or more inversion pulses, or one or more hybrid saturation-inversion pulses.

20. The system of claim 15, wherein the instructions cause the processing unit to:

apply a plurality of phase alternated pairs as part of the NMR pulse sequence, the plurality of phase alternated pairs comprising different wait times and different number of echoes, wherein each of the plurality of phase alternated pairs comprises two sequences of RF pulses of opposite phase.

* * * * *